United States Patent [19]
Bonne et al.

[11] Patent Number: 5,176,358
[45] Date of Patent: Jan. 5, 1993

[54] MICROSTRUCTURE GAS VALVE CONTROL

[75] Inventors: Ulrich Bonne, Hopkins; Thomas R. Ohnstein, Roseville, both of Minn.

[73] Assignee: Honeywell Inc., Minneapolis, Minn.

[21] Appl. No.: 742,368

[22] Filed: Aug. 8, 1991

[51] Int. Cl.⁵ .................. F16K 31/02; F16K 31/365
[52] U.S. Cl. ........................ 251/30.05; 251/30.02; 251/33; 251/45; 251/368; 91/52
[58] Field of Search ............... 251/41, 39, 46, 45, 251/34, 368, 30.05, 30.02; 91/52

[56] References Cited

U.S. PATENT DOCUMENTS

| | | |
|---|---|---|
| 2,164,511 | 7/1939 | Furlong ................ 251/41 X |
| 3,414,010 | 12/1968 | Sparrow . |
| 4,203,128 | 5/1980 | Guckel et al. . |
| 4,418,886 | 12/1983 | Holzer . |
| 4,501,144 | 2/1985 | Higashi et al. . |
| 4,548,078 | 10/1985 | Bohrer et al. . |
| 4,581,624 | 4/1986 | O'Connor . |
| 4,585,209 | 4/1986 | Aine et al. . |
| 4,647,013 | 3/1987 | Giachino et al. . |
| 4,722,360 | 2/1988 | Odajima et al. . |
| 4,756,508 | 7/1988 | Giachino et al. . |
| 4,821,999 | 4/1989 | Ohtaka . |
| 4,826,131 | 5/1989 | Mikkor . |
| 4,898,200 | 2/1990 | Odajima et al. . |
| 4,914,742 | 4/1990 | Higashi et al. . |
| 4,944,035 | 7/1990 | Aagardl et al. . |

FOREIGN PATENT DOCUMENTS

| | | |
|---|---|---|
| 0112701 | 7/1984 | European Pat. Off. . |
| 0160463 | 11/1985 | European Pat. Off. . |
| 0250948 | 1/1988 | European Pat. Off. . |
| 0261972 | 3/1988 | European Pat. Off. . |
| 0276156 | 7/1988 | European Pat. Off. . |
| 2639085 | 5/1990 | France . |
| 2155152 | 9/1985 | United Kingdom . |

OTHER PUBLICATIONS

1991 International Conference on Solid-State Sensors and Actuators, Digest of Technical Papers, "Electrically Activated, Normally-Closed Diaphragm Valves", pp. 1045-1048, 91 CH2817-5/91/0000-1045 ©1991 IEEE, Hal Jerman, IC Sensors.

IEEE, Proc. on Micro Electro-Mechanical Systems, 1990, Feb., pp. 95-98, "Micromachined Silicon Microvalve", Tom Ohnstein et al.

Primary Examiner—Arnold Rosenthal
Attorney, Agent, or Firm—Michael B. Atlass; Frederick W. Niebuhr

[57] ABSTRACT

A flow control device includes a housing with separate main flow and flow control (servo) passages between an inlet port and an exit port. A control chamber in the housing is in fluid communication with the servo passage. A flexible membrane forms a partition between the main flow passage and the control chamber. The servo passage includes a variable servo orifice upstream of the control chamber and a fixed orifice downstream of the chamber. When the servo valve is open to permit passage of fluid into the control chamber, the resultant pressure on the membrane maintains the main valve closed. The main valve opens in response to closing the servo valve. The fixed orifice has a profile sufficiently small to provide for an acceptable leak or continuous fluid flow through the device when the servo valve is open, and further provides for a soft start when the servo valve is closed to open the main valve. The fixed orifice, servo valve including a servo valve orifice and electrostatically controlled closure tabs, and a microbridge flow sensing device, are advantageously formed on a monolithic semiconductor chip mounted inside the housing.

40 Claims, 5 Drawing Sheets

MICROSTRUCTURE GAS VALVE CONTROL

BACKGROUND OF THE INVENTION

This invention relates to fluid control apparatus, and more particularly to devices that employ microminiature valves, sensors and other components for controlling pressure responsive valves in fluid passages.

Fluid valves typically employ flexible membranes or other pressure responsive elements in governing fluid flow. A typical valve includes a housing with inlet and outlet ports, and a valve seat along the main passage between the ports. A flexible membrane or diaphragm near the valve seat forms a partition between the passage and a pressure chamber. An intake passage to the pressure chamber communicates with the inlet port, whereby fluid can enter the chamber. An outlet passage from the chamber to the outlet port provides pressure relief. An electromagnetic servo valve or pilot valve is provided in the outlet passage.

When the pilot valve is closed, fluid enters the pressure chamber via the intake passage and increases pressure in the chamber, flexing the diaphragm against the valve seat to prevent fluid flow through the main passage. Opening of the servo valve permits fluid flow out of the chamber through the outlet passage, and the diaphragm is removed from the valve seat in response to the diminishing fluid pressure in the pressure chamber, thus opening the main valve. An exemplary valve of this type is a hydraulic valve disclosed in U.S. Pat. No. 4,418,886 (Holzer).

U.S. Pat. No. 4,898,200 (Odajima et al) and U.S. Pat. No. 4,722,360 (Odajima et al) disclose fluid control devices in which a nozzle back pressure is selectively varied to control a valve positioned between a supply port and an output port. The control mechanism includes side-by-side piezoelectric ceramic members movable between open nozzle and closed nozzle positions. When the nozzle is open, back pressure, atmospheric pressure and supply pressure reach an equilibrium that keeps the main valve closed.

U.S. Pat. No. 3,414,010 (Sparrow) discloses a modulating valve in which current to an electromagnet flexes a magnetostrictive bimetal member, in turn flexing a modulating valve diaphragm to restrict fluid flow. The resulting increased pressure in a pressure chamber flexes a diaphragm along one side of the pressure chamber, to open a main valve.

While these devices perform satisfactorily, they have inherent difficulties as well, including their large size and weight, the required level of volts and watts to operate the pilot valves, their relatively high fabrication cost, and their lack of direct compatibility with digital data storage and handling apparatus. This final disadvantage is substantial in view of the continuing trend to increasingly employ microprocessors in controlling valves and other devices. A further disadvantage is the lack of ability to modulate these pilot valve structures, i.e. to effectively adjust the pilot valve to a position intermediate fully open and fully closed.

Therefore, it is an object of the present invention to provide a fluid valve in which the servo valve is compatible with transistor-transistor logic (TTL), to facilitate microprocessor control including modulation of the pilot valve.

Another object is to provide a fluid valve in which a fixed orifice, a variable servo orifice and a fluid flow sensing device are provided in a monolithic semiconductor chip.

A further object of the invention is to provide a gas valve in which a normally open servo valve maintains the main valve closed while providing an acceptably low flow of gas.

Yet another object is to provide a low cost and reliable fluid valve operable at low voltages.

SUMMARY OF THE INVENTION

To achieve these and other objects, there is provided a fluid valve. The valve has a housing with an inlet port, an exit port, a main passage between the inlet port and the exit port, and a servo passage between the inlet and exit ports. A control chamber is provided within the housing, in fluid communication with the servo passage. A main valve means in the housing includes a valve seat in the main passage, and a main valve membrane or closure mounted near the valve seat. The main valve closure is movable against the valve seat to close the main valve means responsive to an increase in pressure within the control chamber. The main valve closure further is movable away from the valve seat to open the main valve responsive to decreases in pressure in the control chamber. A fixed orifice in the servo passage allows fluid to flow from the control chamber to the exit port. The fixed orifice has a profile with a size selected to restrict the flow of fluid from the control chamber to a predetermined maximum amount, in response to an expected maximum pressure differential across the fixed orifice. A servo valve in the servo passage includes a servo orifice for allowing fluid to flow from the inlet port into the control chamber. A servo closure, mounted near the servo valve orifice, moves between a closed position against the servo valve orifice to prevent the flow of fluid therethrough, and an open position for allowing fluid to flow from the inlet port into the control chamber.

Preferably the servo valve closure is an elastically deformable tab or flap, normally disposed in the open position and movable into the closure position responsive to an applied electrostatic force. The preferred main valve closure is a flexible diaphragm forming a partition between the main passage and the control chamber.

According to another aspect of the invention, a monolithic semiconductor chip is mounted in the fluid valve housing. The fixed orifice is formed through the chip, and allows fluid to flow between the control chamber and a selected one of the inlet and outlet ports. A servo valve means includes a servo valve orifice formed, through the semiconductor chip and disposed in the servo passage. The servo valve orifice allows fluid flow between the control chamber and the other one of the inlet and outlet ports. The servo valve further includes a servo closure mounted proximate the servo orifice for movement between a closed position against the servo orifice to prevent fluid flow therethrough, and an open position for allowing fluid flow through the servo orifice.

A sensing means preferably is mounted on the semiconductor chip and disposed along the main passage, for detecting the rate of fluid flow.

The preferred servo valve closure means is a flap movable toward and away from the servo valve orifice. The flap is formed as part of a dielectric layer applied to the semiconductor chip, and includes an embedded electrode. A potential applied to the electrode provides an electrostatic force for positionally adjusting the flap to open or close the servo valve orifice.

An advantage of the invention arises from providing a fixed orifice with a substantially reduced profile, e.g. circular with a diameter of 2-10 mils or square with sides of 2-10 mils, and locating the fixed orifice between the control chamber and the exit port. In this configuration, the servo valve is positioned between the inlet port and the control chamber, and is kept open to maintain the main valve closed.

The normally open servo valve results in a continuous fluid flow (leak) through the servo passage. Due to its small profile, however, the fixed orifice restricts this leak to a minute, acceptable level, e.g. fifty cubic centimeters per hour, based upon a maximum expected pressure differential across the fixed orifice of about 0.5 pounds per square inch. The main valve remains closed unless a potential is applied to electrostatically close the servo valve. An interruption in power to the servo valve causes it to open, which closes the main valve, thus insuring fail-safe operation of the main valve.

The size of the control chamber and servo orifice can be selected with reference to the fixed orifice, to further enhance operation of the valve. More particularly, the control chamber volume when sufficiently large, provides a "soft start" of the main valve in response to closure of the servo valve. More particularly, the reduced profile fixed orifice causes a gradual release of fluid from the control chamber, and a correspondingly gradual diaphragm movement away from the valve seat. In practice, it has been found feasible to provide main valve starting times in the range of from 1 to 10 seconds.

Conversely, main valve closure should occur more rapidly, preferably in less than one second. To this end, the control chamber volume can be kept to less than an acceptable maximum, and the servo valve orifice profile can be substantially larger than the profile of the fixed orifice, e.g. in the range of from 3 to 10 times as large.

Another feature of the invention arises from the electrostatically controlled flap or closure in the servo valve, in that the potential applied to the electrodes can be controlled in order to provide for a partial closure of the servo valve. Alternatively, a pulse modulated voltage can be applied to the electrode. In either case, modulation of the servo valve results in a corresponding modulation of the main valve, substantially increasing the degree of control over fluid flow through the valve. The servo valve can be operated under low voltage, e.g. substantially less than 50 volts, is actuated, e.g. closed with extremely low energy levels in the range of about a microjoule, and maintained closed with very low power levels, e.g. in the range of microwatts.

Thus, in accordance with the present invention a small, low cost valve configuration operates in a fail-safe manner under low power requirements, and affords a soft start and a sufficiently rapid closure of a servo controlled main valve.

IN THE DRAWINGS

For a further understanding of the above and other features and advantages, reference is made to the following detailed description and to the drawings, in which.

DETAILED DESCRIPTION OF THE PREFERRED EMBODIMENTS

Figure 1:
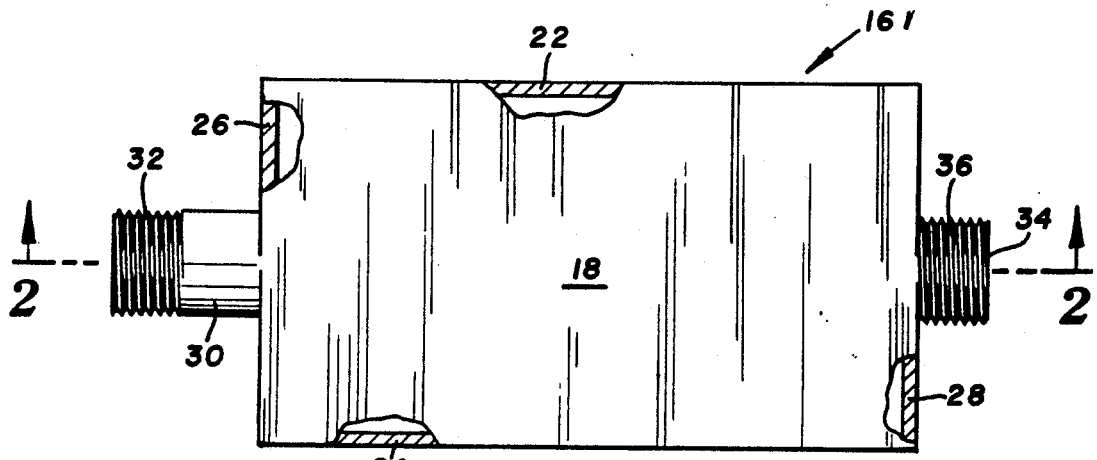
FIG. 1 is a top view of a gas valve constructed in accordance with the present invention.
Figure 2:
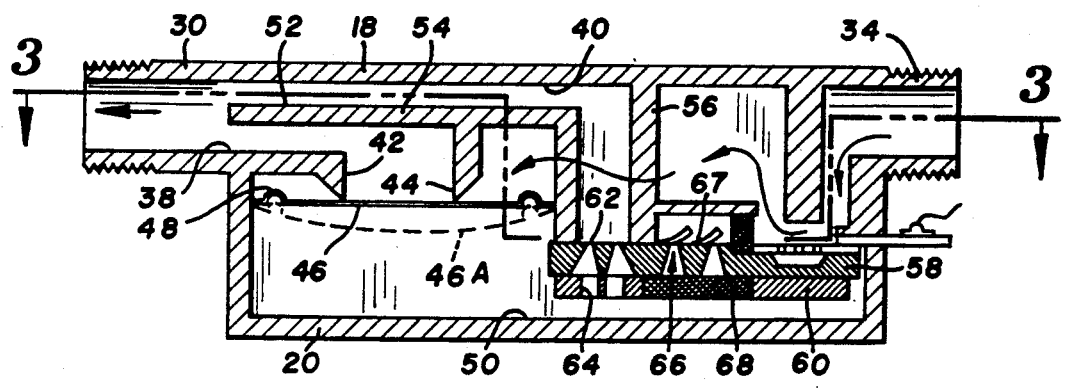
FIG. 2 is a sectional view taken along the line 2—2 in FIG. 1.
Figure 3:
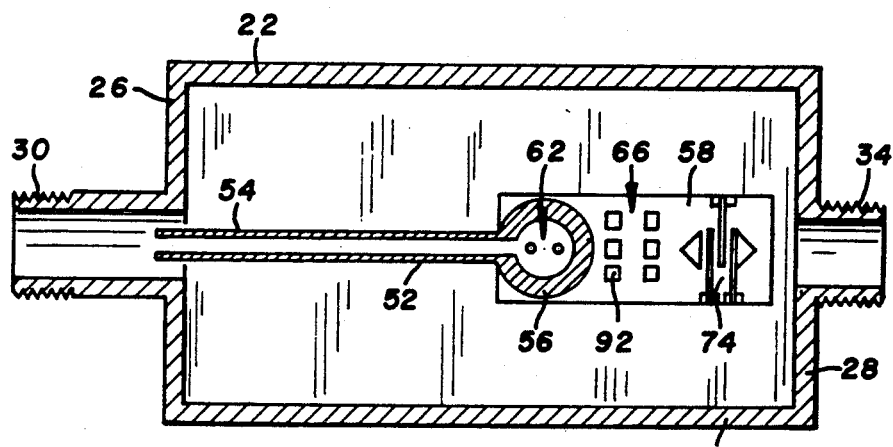
FIG. 3 is a sectional view taken along the line 3—3 in FIG. 2.

Turning now to the drawings, there is shown in FIGS. 1-3 a gas flow regulating device 16 having a rigid, rectangular housing (typically aluminum) including a top wall 18, a bottom wall 20, opposed side walls 22 and 24 and opposite end walls 26 and 28. A conduit 30 with external threads 32 extends from end wall 26, while a similar conduit 34 with external threads 36 fixed ends from the opposite end wall. Conduits 30 and 34 provide for fluid communication between regulating device 16 and a supply or source of gas (not shown), and between the device and household appliances using gas.

Conduit 30 can be connected to the supply and conduit 34 connected to an appliance, to provide for gas flow from left to right as viewed in FIG. 2. Thus, conduit 30 provides an inlet or supply port, while conduit 34 provides an exit or outlet port. Alternatively, conduit 34 can be connected to provide the inlet port, with conduit 30 providing the exit port. In this latter (and preferred) arrangement, the servo valve remains open in order to maintain the main valve closed, which is advantageous in combination with a properly sized fixed orifice.

As perhaps best seen in FIG. 2, wall sections within the housing define a main fluid passage 38 and a control flow passage or servo passage 40, both of which are in fluid communication with conduits 30 and 34. An annular wall section forms a valve seat 42 along the main flow passage. Valve seat 42 is part of a main valve 44 which also includes a thin, circular and flexible membrane or diaphragm 46 constructed of rubber. Membrane 46 is planar, except for an annular prominence 48 formed near the periphery to stiffen the membrane. The membrane is shown in solid lines engaged with valve seat 42, which closes the main valve to prevent passage of gas through the main flow of passage. When membrane 46 is deflected away from the valve seat, as shown in broken lines at 46a, gas flows through the main flow of passage as indicated by the arrows in FIG. 2, with conduit 34 providing the inlet port.

Membrane 46 forms a partition between main flow passage 38 and a valve control chamber 50 below the membrane. The main valve is governed by the pressure differential across membrane 46. More particularly, when fluid pressure in chamber 50 is equal to or greater than fluid pressure above the membrane, the membrane remains against valve seat 42 as shown in FIG. 2 in solid lines. When control chamber pressure is less than pressure above the membrane, the differential provides a force to deflect the membrane downwardly to open the main valve. As seen in FIGS. 2 and 3, servo passage 40 is formed by a control flow tube 52 with a relatively narrow, horizontal section 54 and a somewhat wider vertical section 56.

A semiconductor chip 58 is supported on a plate 60 immediately below section 56 of the control flow tube. A fixed orifice 62 is etched through semiconductor chip 58, and an opening 64 is formed through plate 60 immediately below the fixed orifice. A servo valve orifice 66 forms part of a microvalve 67. Orifice 66 is etched through the chip above a large opening through plate 60, occupied by a filter 68. Thus, servo passage 40 is in fluid communication with valve control chamber 50. Fluid in passage 40 flows downward through servo valve orifice 66 and filter 68 into the control chamber, then upwardly through opening 64 and fixed orifice 62, to the exit port.

A filter 70 is mounted between semiconductor chip 58 and a shelf 72 above servo valve orifice 66. Filter 70 cooperates with filter 68 to protect microvalve 67 against particulate contamination.

Immediately upstream of filter 70 (i.e. to the right of the filter as viewed in FIG. 2), main flow passage 38 and servo passage 40 merge and communicate with conduit 34, which in this configuration provides the inlet port. A microbridge flow sensor 74 is formed in the semiconductor chip along the region of merger, and detects the rate of gas flow toward the passages. A connector 76 is electrically coupled to electrical circuitry formed on semiconductor chip 58 for electrostatically controlling microvalve 67 in a manner explained below.

Semiconductor chip 58 preferably is formed of silicon. Substantial portions of semiconductor chip are removed by etching or otherwise, to form pedestals 78 that contact plate 60, fixed orifice 62, servo valve orifice 66, and microbridge flow sensor 74 on a comparatively thin bridge 84. Fixed orifice 62 consists of two circular apertures 86 and 88 through chip 58, although the apertures could be rectangular as well. These apertures are sized to provide a combined profile (i.e. open area in the direction normal to fluid flow) equivalent to the profile of a single opening having a diameter in the range of from 2-10 mils, i.e. from about $2 \times 10^{-3}$ mm² to about $5 \times 10^{-2}$ mm². It is to be appreciated that the term "orifice profile" as used herein refers to the profile of the aperture in the case of a single aperture orifice, or the combined or composite profile of a plurality of apertures forming a single orifice, whether or not such apertures are circular. The fixed aperture profile thus is substantially less than a typical profile of conventional fixed apertures in this type of valve (e.g. at least 0.02 inches in diameter).

Microvalve 67 includes six apertures 90 forming the servo valve orifice. Each of apertures 90 has an associated closure plate or tab 92, fixed at one end in cantilever fashion with respect to semiconductor chip 58. Each tab is flexible whereby it is movable between an open position as illustrated in FIGS. 2 and 4, and a closed position in which the tabs collectively prevent fluid flow through the servo valve orifice.

Figure 5:
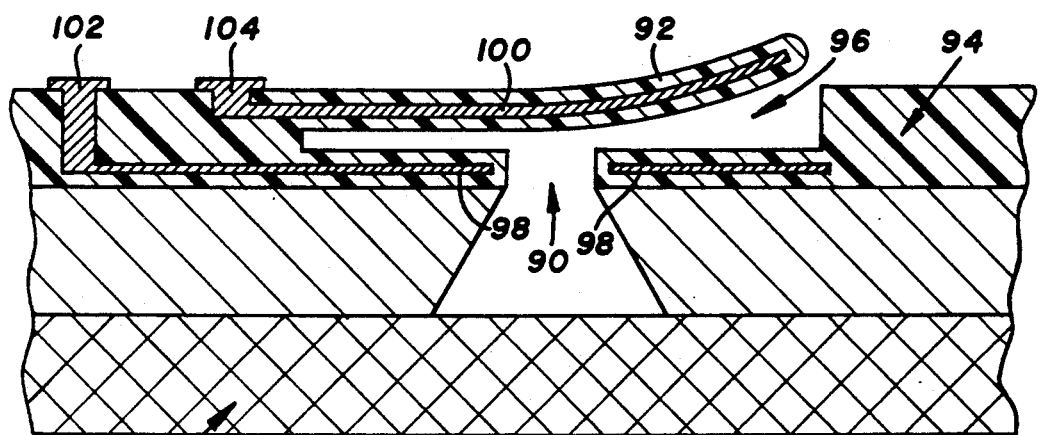
FIG. 5 is a further enlarged view of a portion of FIG. 4.

FIG. 5 illustrates one of apertures 90 forming the servo valve orifice, and its associated one of tabs 92. The tabs are formed, first by depositing a dielectric layer 94, for example silica ($SiO_2$) or silicon nitride ($Si_3N_4$) onto the upper surface of chip 58. Tab 92 is formed of the dielectric material as part of layer 94. A gap 96 between the tab and remainder of the layer is formed by depositing a sacrificial layer of aluminum, and subsequently etching away the aluminum. Two electrodes are encapsulated in the dielectric layer near aperture 90, including a fixed electrode 98 integral with the semiconductor chip, and a movable electrode 100 in tab 92. Electrodes 98 and 100 preferably are constructed of chrome, platinum, gold, or nickel iron. Conductors 102 and 104 electrically couple their associated electrodes to connector 76.

Figure 4:
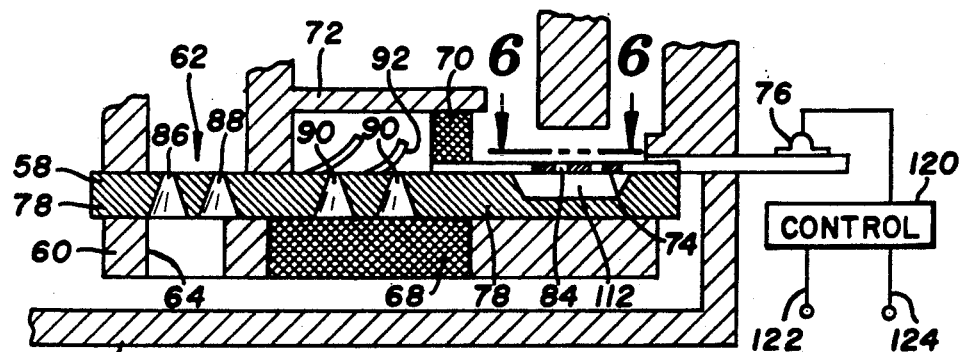
FIG. 4 is an enlarged view of a portion of FIG. 2.

Normally, i.e. when not subject to an external stress, each tab 92 is in the open position as in FIG. 4. Microvalve 67 is closed by bringing tabs 92 into engagement with the dielectric layer immediate their respective apertures 90, to prevent fluid flow through these apertures. In connection with tab 92 in FIG. 5, power is supplied to conductors 102 and 104 to provide potentials of opposite polarity in electrodes 98 and 100. This tends to draw the electrodes toward one another, eventually moving tab 92 into a complete closure. When equal potential is applied to the conductive film electrodes, or when conductors 102 and 104 are shorted, tab 92 returns to the open position under an internal, elastic restoring force. Given the size of tabs 92 and electrodes 98 and 100 (e.g. in the 50–500 micron range), a minute power requirement in the range of $10^{-6}$ joules is sufficient to maintain the tabs in their closure positions. In the normally open valve, the pressure differential on opposite sides of microvalve 67 tends to move tabs 92 into the closed position, and tends to keep the tabs closed. Accordingly, tabs 92 are formed with a restoring force sufficient to open them against the force of the pressure differential in the absence of the electrostatic closure force. For further information on microvalves of this type, reference is made to U.S. patent application Ser. No. 07/457,452 entitled "Electronic Microvalve Apparatus and Fabrication", filed Dec. 27, 1989 and assigned to the assignee of this application.

As an alternative to the arrangement shown in FIGS. 2 and 4, tabs 92 could be positioned along the bottom of semiconductor chip 78 rather than the top, which of course necessitates a slight repositioning of filter 68 to provide clearance for the tabs to open. This alternative arrangement would be fail safe, in that the pressure differential on opposite sides of microvalve 67 would tend to open tabs 92, rather than close them, thus tending to close the main valve. This alternative, however, would be more difficult to fabricate, either requiring multilayer processing on both sides of a single semi-conductor chip, or requiring at least two chips.

As previously mentioned, fixed orifice 62 has a profile substantially less than that of a typical orifice in conventional valves of this type. One reason for the substantially reduced profile is the normally open condition of microvalve 67. With the microvalve open as shown in FIG. 2, gas from the supply flows through conduit 34 and servo valve orifice 66 into valve control chamber 50. Further, gas from the control chamber flows through fixed orifice 62 and out of the valve through conduit 30, resulting in a continuous flow or leak through regulating device 16. However, in view of the fixed orifice profile and a maximum expected pressure differential across the fixed orifice of about 0.5 pounds per square inch, the continuous flow is less than 50 cubic centimeters per hour, well below the limit of 200 cubic centimeters per hour required for AGA acceptance.

A further advantage arises from the manner in which the profile of servo valve orifice 66 and the volume of control chamber 50 can be selected in view of the fixed orifice profile, to provide a valve with a reasonably short time (under one second) to close the main valve, and a "soft" start-up of more than one second. More particularly, servo valve orifice 66 is formed with a profile ranging from three to ten times the fixed orifice profile. Accordingly, so long as microvalve 67 is open, gas tends to flow into control chamber 50 more rapidly than it flows out of the chamber through the fixed orifice, until an equilibrium is reached of relatively high pressure in the control chamber, thus maintaining membrane 46 against valve seat 42. Of course, the largest flow differential occurs when microvalve 67 is first opened, having been maintained closed to keep main valve 44 open. As the servo valve orifice profile is increased relative to a given fixed orifice profile and valve control chamber volume, the time for closing main valve 44 decreases. Start-up time, by contrast, is largely a function of the fixed orifice profile and volume of valve control chamber 50.

In one example, the fixed orifice was given a profile to insure a maximum leak of 50 cubic centimeters per hour, and the microvalve was designed for a range of flow rates, from closed to open, of from 5 to 500 cubic centimeters per hour. The variance in control chamber volume over nominal chamber volume ($dV/Vmax$) is assumed equal to the deviation in pressure over nominal pressure ($dP/P$) which, assuming atmospheric pressure of 14.7 pounds per square inch and a differential of 0.5 pound per square inch across device 16, is:

$$0.5 \text{ psi}/14.7 \text{ psi} = 0.034$$

Using this factor, the nominal (maximum) volume for control chamber 50, to achieve a starting or valve opening time of less than or equal to ten seconds, is calculated as follows:

$$V \leq \frac{10/3600 \ h \times (50 - 5) \text{ cm}^3/h}{0.034} = 3.7 \text{ cm}^3$$

The closing time, assuming a maximum flow rate of 500 cm³/h (i.e. 0.14 cm³/s), is calculated as follows:

$$t_{close} = (3.7 \text{ cm}^3 \times 0.034)/0.14 \text{ cm}^3/s$$
$$= 0.089 \text{ seconds}$$

The control chamber volume of 3.7 cm³, is substantially less than corresponding chamber volumes in conventional valves, which typically are well over 100 cm³. From the above example it is seen that closing time can be reduced by reducing the control chamber volume, or by enlarging servo valve orifice 66 to increase the maximum flow rate through an open microvalve 67. Further, enlarging the servo valve orifice facilitates reducing closing time with negligible impact upon start-up time.

An advantage of microvalve 67 arises from the ability to modulate this valve, i.e. maintain each tab 92 in a partially open position as illustrated in FIG. 5. Each tab is maintained partially open by providing potentials of opposite polarity to electrodes 98 and 100, but at levels insufficient for complete closure. The actual levels applied can be reduced. Alternatively, applied levels are effectively reduced by pulse modulation of the level normally applied to close the tabs.

A controller 120 (FIG. 4) determines the level of power provided to microvalve 67 over conductors 102 and 104 via connector 76, to open and close tabs 92, or to modulate the tabs in setting their position intermediate full closed and fully opened. Controller 120 governs microvalve 67 based on selected inputs, for example a temperature control setting for an appliance over a line 122, or input from microbridge flow sensor 74 over a line 124. The operation of devices such as controller 120 is known in the art, not particularly germane to the present invention, and thus not further discussed herein.

Figure 6:
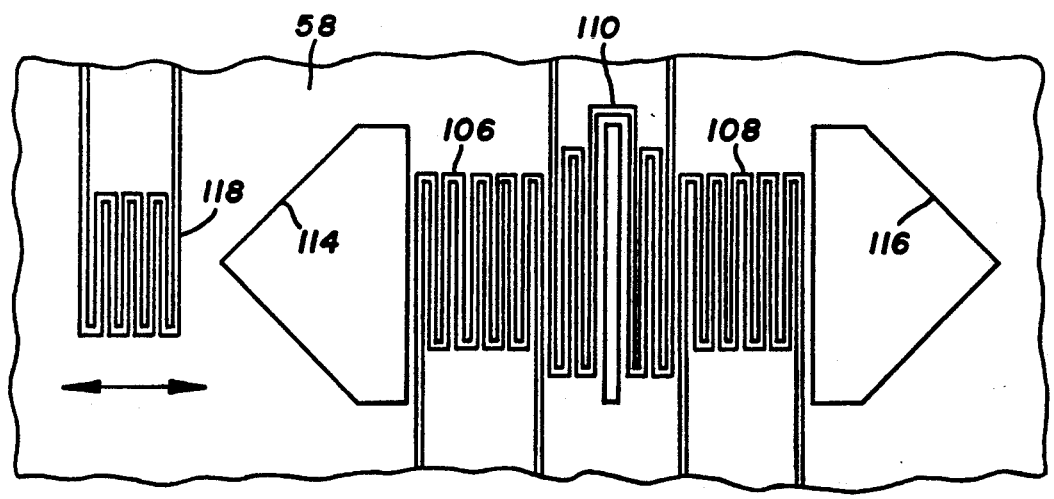
FIG. 6 is a top view of a flow sensor of the valve, taken along the line 6—6 in FIG. 4.

FIG. 6 illustrates the portion of bridge 84 including microbridge flow sensor 74. Semiconductor chip 58 forms the body or base that supports the flow sensor. Sensor 74 includes two substantially identical thin film resistor grids 106 and 108 that function as heat sensors. A thin film heater resistor grid 110, centrally positioned between resistor grids 106 and 108, generates heat sensed by the resistor grids. The heater and resistor grids preferably are fabricated of nickel-iron or platinum, and encapsulated in a thin film of a dielectric such as silicon nitride.

An air space or gap 112 (FIG. 4) is formed in the chip just below bridge 84. As a result, heater 110 and resistor grids 106 and 108 are substantially surrounded by air. Openings are formed through dielectric layer 94 on opposite sides of the heater and sensing resistor grids, as indicated at 114 and 116, to promote the flow of ga below bridge 84 as well as above it. Consequently, heat received by resistor grids 106 and 108, as a result of heat generated by heater grid 110, is due to convective transfer and to a lesser extent radiation, as opposed to conduction through the silicon nitride dielectric layer.

Given the specific heat capacity of the gas, and ambient temperature as sensed by a thin film reference sensor grid 118 upstream of the heater and sensing grids, the rate of fluid flow is determined with accuracy, based upon the temperature difference between the upstream and downstream temperatures sensed at resistor grids 108 and 106, respectively. For further information concerning this type of flow sensor, reference is made to U.S. Pat. No. 4,501,144 (Higashi et al).

Figure 7:
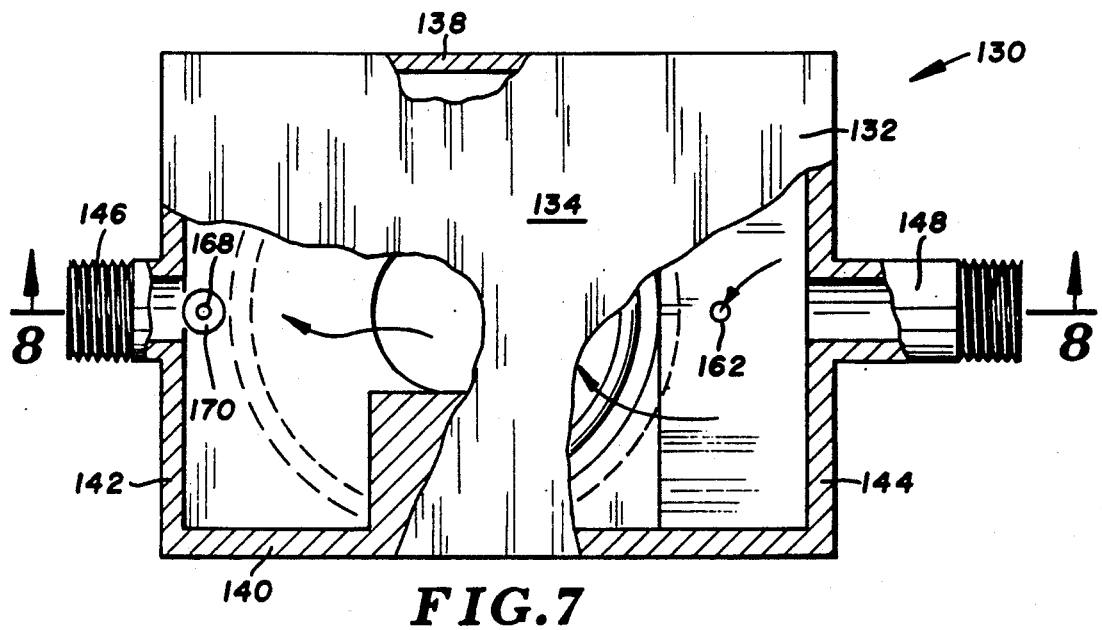
FIG. 7 is a top view of a gas valve according to a second embodiment of the invention.
Figure 8:
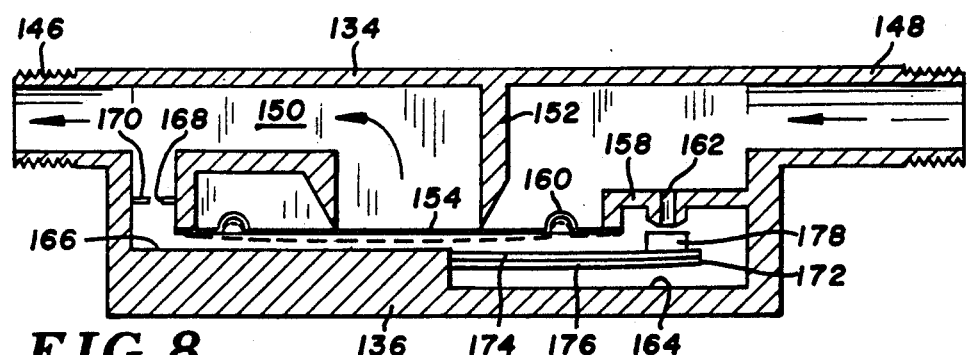
FIG. 8 is a sectional view taken along the line 8—8 in FIG. 7.

FIGS. 7 and 8 show an alternative embodiment flow regulating device 130 constructed in accordance with the present invention. Device 130 includes a rectangular housing 132 having top and bottom walls 134 and 136, opposite side walls 138 and 140, and opposite end walls 142 and 144. A conduit 146 having external threads extends from end wall 142 and provides an exit port. A similar conduit 148 provides an inlet or supply port.

A main flow passage 150 tends from conduit 146 to conduit 148. Along the main passage, an annular wall section forms a valve seat 152. A membrane 154 is mounted inside of housing 132 and can engage the valve seat as shown in FIG. 8 to close the main valve. As indicated in broken lines at 154a, membrane 154 is movable away from the valve seat to open the valve for fluid flow along the main passage. Interior wall sections 156 and 158 support membrane 154 at is periphery. The membrane is flexible and planar, with the exception of an annular prominence 160.

A servo valve orifice 162 is formed through wall section 158, to permit fluid flow from inlet port conduit 148 into a control chamber 164. The control chamber forms part of a servo (control fluid) passage 166 between the inlet port and outlet port conduit 146. Fluid from the control chamber flows to the outlet port through a fixed orifice 168 formed through a sheet metal panel 170.

A piezoelectric actuator 172, including cantilevered side-by-side piezoelectric layers 174 and 176 and a seal member 178, is movable (responsive to a power supply and controller, not shown) between an open position as shown in FIG. 8, and a closed position in which seal member 178 abuts wall section 158 to prevent the flow of fluid through servo valve orifice 162.

Flow control device 130 has a normally open servo valve. With actuator 172 open as shown in FIG. 8, fluid from conduit 148 enters the control chamber, thus biasing membrane 154 into engagement with valve seat 152 to maintain the main valve closed. In this condition, fluid continually leaks, i.e. flows to exit conduit 146 through fixed orifice 168. The profile of orifice 168, of course, is selected as explained in connection with device 16 to ensure that the fluid leak is acceptably low.

When it is desired to open the main valve, the controller is used to apply the appropriate voltage to piezoelectric actuator 172, whereby piezoelectric layers 174 and 176 carry seal member 178 into the closure position. As fluid continues to flow out of fixed orifice 168, a pressure differential across membrane 154 eventually provides a force sufficient to move the membrane away from the valve seat, opening the main valve.

Flow regulating device 16 can be operated in an alternative or reverse manner to that earlier described, by configuring conduit 30 as the supply port and conduit 34 as the exit port. In this arrangement, servo microvalve 67 is normally closed, i.e. remains closed in order to keep main valve 44 closed. Tabs 92, when closed in this configuration, allow fluid to flow from the supply port through fixed orifice 62 into valve control chamber 50, thus to provide pressure in the chamber that maintains the membrane against valve seat 42.

When it is desired to open the main valve, tabs 92 are electrostatically opened. With servo valve 67 open, servo valve orifice 66 provides a pressure relief opening through which fluid flows out of the valve control chamber. As pressure in the control chamber subsides, the pressure differential across membrane 46 eventually provides sufficient force to remove the membrane from the valve seat and open the main valve.

When closing the main valve is desired, tabs 92 are returned to the closed position, increasing pressure within valve control chamber 50, eventually returning membrane 46 to engagement against the valve seat.

Figure 9:
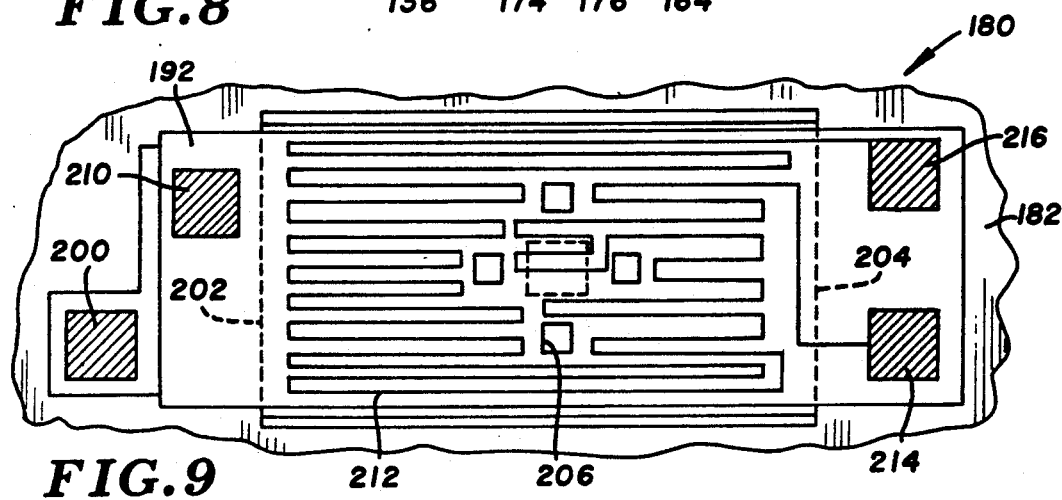
FIG. 9 is a top view of a normally closed microvalve employed in accordance with a third embodiment of the invention.
Figure 10:
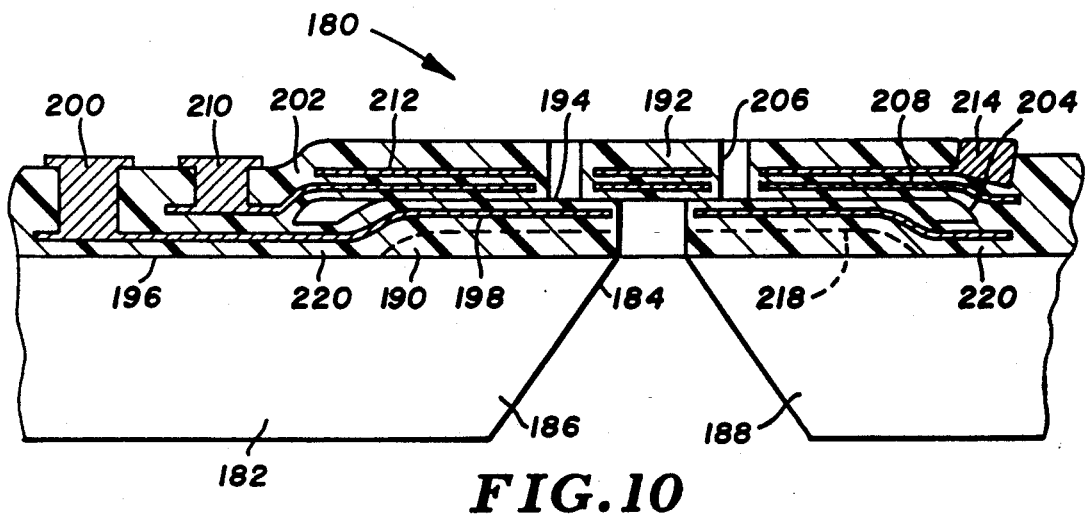
FIG. 10 is a sectional view taken along the line 10—10 in FIG. 9, showing the microvalve closed.
Figure 11:
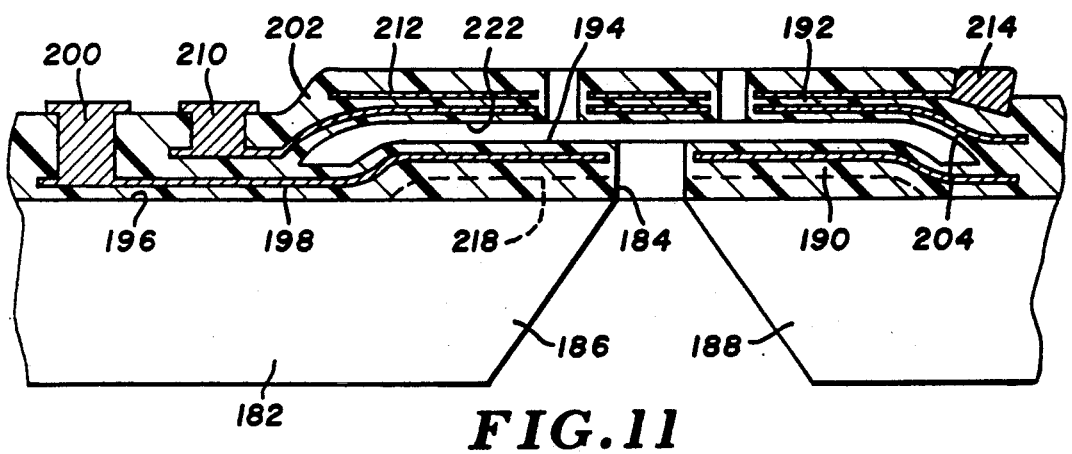
FIG. 11 is a view similar to that in FIG. 10, showing the microvalve open.

FIGS. 9-11 show a microvalve 180 particularly well suited for configurations in which the microvalve is normally closed. The microvalve structure is formed on a semiconductor chip 182 similar to semiconductor chip 58, preferably formed of silicon. A servo valve orifice 184 is formed between two pedestals 186 and 188 of the semiconductor chip. Two or more such servo valve orifices can be provided, if desired. While only the portion of semiconductor chip 18 relating to microvalve 180 is shown, it is to be understood that this semiconductor chip likewise is etched to provide the additional pedestals and bridges appropriate to provide a fixed orifice and a microbridge flow sensor.

Microvalve 180 is formed by depositing a plurality of thin film layers upon semiconductor chip 182. These include dielectric layers preferably of silicon nitride, electrically conductive layers preferably of platinum, and a sacrificial layer. The sacrificial layer preferably is molybdenum.

These layers cooperate to provide a valve seat 190 and a valve bridge 192, formed of the silicon nitride and having embedded conductors.

Valve seat 190 surrounds and is generally centered on orifice 184, and is substantially uniform in thickness to provide a valve seat face or lip 194, longitudinally (vertically in FIG. 10) spaced apart from a substrate surface 196 by a distance d. The thickness in the valve seat diminishes at its periphery. An electrode 198 is embedded in the valve seat, and a conductive pad 200 facilitates the coupling of electrode 198 to an external voltage source, not shown.

Valve bridge 192 is flexible, moveable elastically toward and away from valve seat 190 between a closure position shown in FIG. 10 and an open position shown in FIG. 11. Valve bridge 192 is free standing, supported by opposite inclined edges 202 and 204 that are anchored below face 194, i.e. nearer to substrate surface 196. A plurality of passages 206 are formed through the valve bridge, and cooperate with servo valve orifice 184 to allow the passage of fluids when the microvalve is open. An electrode 208 is embedded in the bridge, with a pad 210 provided for connecting the electrode to a voltage source.

Also embedded in the bridge is a heater circuit 212, disposed above electrode 208 and connected to a current source through heater pads 214 and 216. As is best seen in FIG. 9, heater circuit 212 is formed in a serpentine path throughout the bridge. Accordingly, when heat is generated by an electrical current in circuit 212, valve bridge 192 is heated substantially throughout its entire volume.

Microvalve 180 is formed using a multi-layer process, beginning with deposition of a mesa 218 in the area of what it is to be the valve seat. Mesa 218 is formed directly on substrate surface 196 with its upper and outer boundary indicated in broken lines. The mesa preferably is formed of silicon nitride. Next, a silicon nitride layer is formed over the mesa and the remainder of substrate surface 196. A platinum thin film is deposited to form electrode 198, followed by another silicon nitride over the electrode and onto the preceding $Si_3N_4$ layer around the electrode. This encapsulates the electrode, to complete valve seat 190. Next, a sacrificial layer of molybdenum is deposited over the valve seat and peripheral region 220 surrounding the valve seat.

To form valve bridge 192, a silicon nitride layer is deposited upon the molybdenum layer and, beyond peripheral region 220, directly onto the previously deposited silicon nitride layer. This forms the attachment region along which inclined edges 202 and 204 are secured. A platinum layer is then deposited to form electrode 208. Another $Si_3N_4$ layer is formed over electrode 208 and the previous $Si_3N_4$ layer, to encapsulate and isolate the electrode from a subsequently deposited Platinum layer which is selectively etched to form heater circuit 212. A final $Si_3N_4$ layer is deposited to encapsulate and electrically isolate the heater circuit, leaving only pads 200 and 210 exposed. Vias are formed in the dielectric layers, to provide passages 206 through the valve bridge, and the openings for conductive pads 200 and 210. For further information on the multi-layer process, reference is made to the aforementioned U.S. patent application Ser. No. 07/457,452.

When formed by sputter deposition, the dielectric ($S_3N_4$) layers exhibit a compressive residual stress. At this stage, the microvalve is annealed at high temperature, for example in the range of about 400 to 700 degrees C. The annealing step relieves the compressive stress in the dielectric layers, and more importantly causes a tensile residual stress in the film layers that form microbridge 192. Due to the high temperatures involved in the annealing step, the conductive material forming the electrodes and heater layer, as well as the sacrificial layer, must be stable at high temperatures. For this reason, molybdenum (rather than aluminum, for example) is recommended for the sacrificial layer, and platinum (rather than chromium) is preferred for the electrically conductive electrodes and heater circuit. Other metals stable at high temperatures can be used to form the electrodes and sacrificial layer.

After annealing, the conductive pads are formed by providing a metal, preferably gold, in the previously formed vias. Forming the pads at this point avoids subjecting them to the high temperatures involved in the annealing step.

As previously mentioned, valve face or lip 194 is higher than the region along with inclined edges 202 and 204 are anchored. As a result, removal of the sacrificial layer does not create a stable gap between valve seat 190 and valve bridge 192. Rather, when released, the valve bridge contracts at least slightly under the residual tensile stress, causing inclined edges 202 and 204 to bend inwardly or toward the servo valve orifice, until a bottom edge 222 of the bridge engages face 194 of the valve seat. Thus, valve bridge 192, under its own residual tensile stress, is spring loaded into the closed position.

An alternative approach to annealing involves forming the silicon nitride layers with a tensile stress, e.g. by plasma-enhanced chemical vapor deposition or low pressure chemical vapor deposition. In either event, the normally closed valve can be operated in either flow direction, i.e. with valve seat 190 either upstream or downstream of orifice 184. An upstream positioning of the valve seat is advantageous, in that gas pressure tends to aid in maintaining the servo valve closed. If desired, closure is further ensured by providing voltages of opposite polarity to electrodes 198 and 208 through pads 200 and 210, respectively. The electrostatic attraction of electrodes 198 and 208 tends to draw the valve bridge toward the valve seat, further ensuring valve closure.

Microvalve 180 is opened by providing current in circuit 212 to heat the valve bridge. The silicon nitride bridge expands as it is heated, tending to pivot edges 202 and 204 away from the orifice, which in turn tends to lift the valve bridge away from the valve seat, opening the microvalve. The heater circuit and electrode 208 tend to exaggerate the response to heating, since the coefficient of thermal expansion for platinum (or other metal employed in the heater circuit and electrode) is more than double the expansion coefficient for silicon nitride. It should be noted that due to the microminiature size of the valve and bridge, electrical power to the heater circuit in the milliwatt range heats the microvalve bridge sufficiently to open the microvalve.

If desired, voltages of the same polarity can be provided to electrodes 198 and 208 at the same time that current is provided in circuit 212 to heat the valve bridge. Then, any electrostatic forces between the electrodes are repulsive, tending to open the microvalve in cooperation with thermal expansion of the valve bridge.

Figure 12:
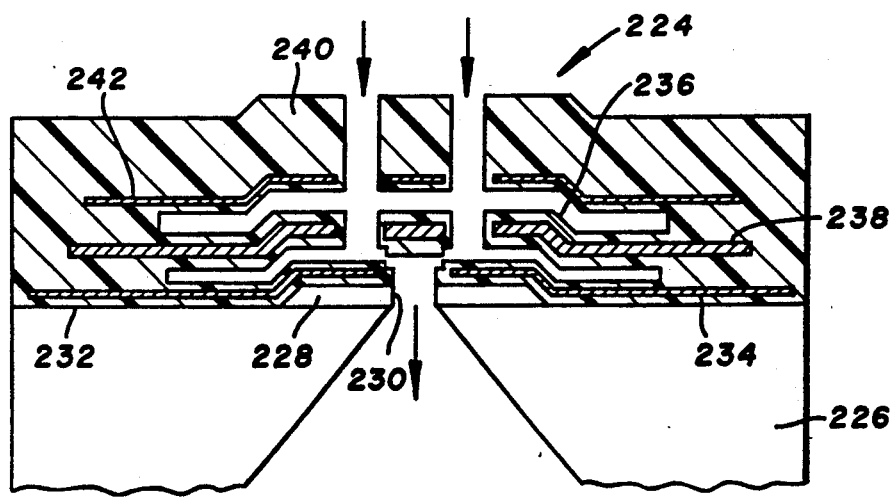
FIG. 12 is a side sectional view of a normally closed microvalve used according to a fourth embodiment.

FIG. 12 shows a microvalve 224 according to a further embodiment of the present invention in which the valve is to be normally closed. Valve 224 is formed on a semiconductor chip 226, and includes a valve seat 228 surrounding a microvalve orifice 230. A mesa is deposited in order to form a valve seat with a top face or a lip above a peripheral region 232. An electrode 234 is encapsulated in the valve seat. The valve seat is silicon nitride, with the electrode formed of platinum. A flexible, silicon nitride valve membrane or diaphragm 236 is spaced apart from the valve seat by virtue of a sacrificial layer. The valve membrane includes an embedded electrode 238, but no heater circuit.

Another sacrificial layer is employed above valve bridge, to separate the bridge from a top layer 240. Top layer 240 is substantially more rigid than the valve membrane, preferably due to enhanced thickness (or use of dielectric material with greater stiffness than silicon nitride). An electrode 242 is embedded into the top layer 240. An annealing step, similar to that used in forming microvalve 180, is employed in connection with microvalve 224 to load the microvalve membrane into the closed position.

When it is desired to open microvalve 224, voltages of like polarity are provided to electrodes 234 and 238, with a voltage of opposite polarity applied to top electrode 242. The resultant electrostatic attraction between electrodes 238 and 242, in combination with the comparative rigidity of top layer 240 as compared to valve membrane 236, flexes the valve membrane away from valve seat 228 and toward top layer 240. When valve closure is desired, the polarity of the voltage supplied to flexible membrane electrode 238 is reversed, causing electrostatic attraction between electrodes 234 and 238, which cooperates with the residual tensile stress in membrane 236 to close the valve.

Microvalves 180 and 224 have a valve bridge and a membrane, respectively, as closure members. It is to be appreciated that in both cases, the closure member could be rectangular and anchored on four sides, a bridge anchored on two sides, or a circular diaphragm. Particularly in the latter case, it is important that the combined cross sectional area of openings through the closure member exceed the cross sectional area of the servo valve orifice. This facilitates closure of the microvalve, at the beginning of closing action against maximum pressure, and again near the point of full closure.

Generally, the configuration in which conduit 34 rather than 30 provides the inlet port, is preferred. In the preferred configuration, a substantially reduced fixed orifice profile tends to increase the time for main valve 44 to open, providing for a desirable soft start. In the alternative arrangement, a reduced sized fixed orifice tends to increase the time necessary for main valve closure. The closure time requirement thus limits the ability to reduce the fixed orifice profile. Further, it is preferred that microvalve 67 remain normally open at zero applied potential. This substantially eliminates the deposit of entrapped particles in the valve seat area when voltage is applied. Thus, the normally open, acceptable leak configuration enhances long-term reliability and performance of the microvalve.

Figure 13:
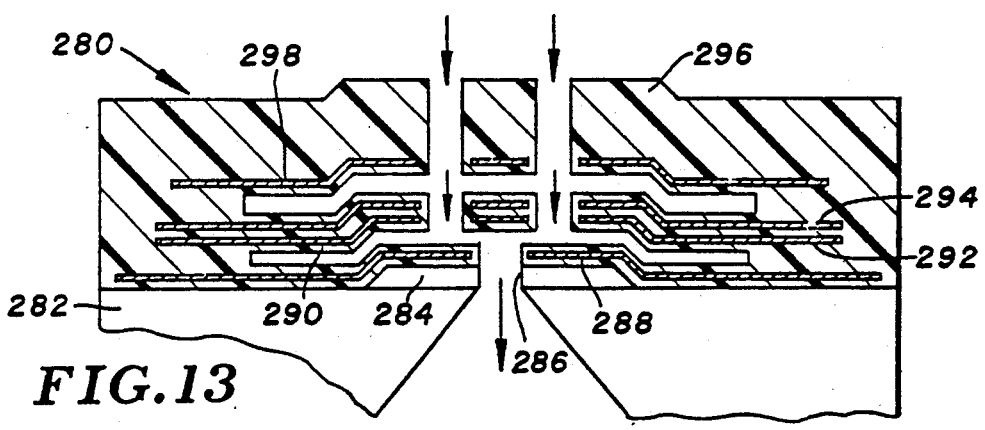
FIG. 13 is a side sectional view of a microvalve according to a fifth embodiment of the invention.

FIG. 13 illustrates a microvalve 280 similar to microvalve 224 of FIG. 12. Valve 280 is formed on a semiconductor chip 282, and includes a raised valve seat 284 surrounding a microvalve orifice 286. An electrode 288 is encapsulated in the valve seat. A flexible silicon nitride valve membrane 290 is spaced apart from the valve seat, and includes two spaced apart, embedded electrodes 292 and 294.

A top layer 296 is spaced apart from the valve membrane, and has an enhanced thickness for increased rigidity as compared to the membrane. An electrode 298 is embedded into top layer 296.

The provision of two electrode pairs, i.e. an upper pair including electrodes 294 and 298, and a lower pair including electrodes 288 and 292, reduces the necessary operating voltage as it reduces the gap between the electrodes in each pair. When it is desired to open microvalve 280, voltages of opposite polarity are applied to electrodes 294 and 298, thus to flex valve membrane 290 toward top layer 296. The microvalve is closed by providing voltages of opposite polarity to electrodes 288 and 292, with the resultant electrostatic attraction cooperating with the residual tensile stress to effect closure.

Figure 14:
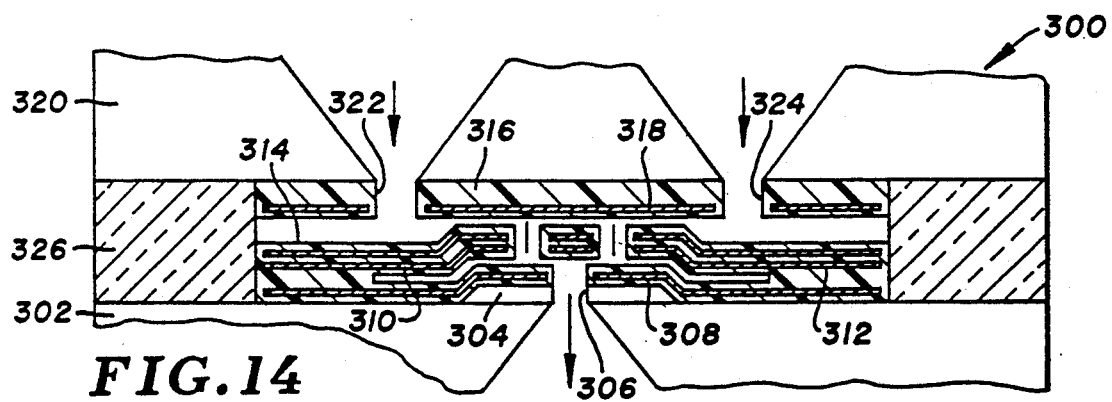
FIG. 14 is a side sectional view of a microvalve according to a sixth embodiment of the invention.

FIG. 14 discloses a microvalve 300 that functions in a manner similar to that of microvalve 280, but is formed according to a different process in which two substrates are employed. More particularly, a semi-conductor chip 302 provides one of the substrates, with a valve seat 304 formed onto chip 302 and surrounding a microvalve orifice 306. An electrode 308 is encapsulated in the valve seat. A flexible valve membrane 310 is spaced apart from the valve seat, and incorporates two spaced apart electrodes at 312 and 314. These layers are formed according to the above described multilayer process.

A top layer 316 and an encapsulated electrode 318, however, are formed by a separate multilayer process on a substrate 320. Substrate 320 can be a semi-conductor chip, or can be formed of Pyrex glass. Flow openings are formed through substrate 320 at 322 and 324. Microvalve 300 thus functions in a manner similar to microvalve 280, with the necessary stiffness of the top layer resulting from a support layer comprised of substrate 320, rather than the top layer thickness.

Forming microvalve 300 involves fabricating two assemblies separately, then bonding the assemblies together. More particularly, a first assembly is made by applying the valve seat and membrane, along with encapsulated electrodes 308, 312 and 314, upon chip 302. A separate assembly is fabricated by depositing top layer 316 and encapsulated electrode 318 onto substrate 320. Orifice 306, and openings 322 and 324, likewise are formed prior to bonding.

The separate assemblies preferably are secured to one another by thermoelectric bonding, involving either deposition of a layer of pyrex glass 326 onto semi-conductor chip 302, or use of a pyrex glass wafer in lieu of the deposited layer. Bonding can be accomplished on a wafer-to-wafer scale, or on a die-to-die scale after wafers have been separated into the individual dies.

Thus, in accordance with the present invention a fluid control device can be made compact and small in size, operate under extremely low power requirements, yet control relatively large fluid flows in a fail safe manner. When configured with the servo valve normally open, and with an acceptable, minute leak controlled through the fixed orifice, the device affords closure of the main valve in a relatively short time for safe operation, in combination with a desirable soft start in opening the main valve.

What is claimed is:

1. A fluid regulating device including:
   a valve housing having an inlet port, an exit port, a main passage between the inlet port and the exit port, and a servo passage between the inlet port and the exit port;
   a control chamber within the housing and in fluid communication with the servo passage;
   a main valve means including a valve seat in the main passage, and a main valve closure mounted proximate the valve seat and movable against the valve seat to close the main valve means responsive to an increase in fluid pressure within the control chamber, said main valve closure further being movable away from the valve seat to open the main valve means responsive to a decrease in fluid pressure within the control chamber;
   a fixed orifice in the servo passage for allowing fluid to flow from the control chamber to the exit port, and having a profile of a selected size for restricting the flow of fluid through the fixed orifice, under an unexpected maximum pressure differential across the orifice, to a predetermined maximum amount; and
   a servo valve means in the servo passage including a servo valve orifice for allowing fluid to flow from the inlet port into the control chamber, and a servo closure mounted proximate the valve orifice for movement between a closed position against the servo valve orifice to prevent the flow of fluid therethrough, and an open position for allowing fluid to flow into the control chamber, wherein the servo closure is maintained normally open to keep the main valve closure against the valve seat, while allowing a continuous and acceptable leakage flow of the fluid, of at most said predetermined amount, from the inlet port to the exit port.

2. The fluid regulating device of claim 1 wherein:
   said servo closure includes an elastically deformable tab normally disposed in said open position, and movable into said closed position when subject to an external force.

3. The fluid regulating device of claim 2 wherein:
   said tab includes a metal electrode, and said external force is electrostatic force.

4. The fluid regulating device of claim 3 further including:
   first and second filtering means respectively upstream and downstream of said servo valve means.

5. The fluid regulating device of claim 1 wherein:
   said main valve closure comprises a flexible membrane forming a partition between the main passage and the control chamber.

6. The fluid regulating device of claim 1 further including:
   a control means for selectively applying said external force to close the servo valve means.

7. The fluid regulating device of claim 6 wherein:
   said control means is operable to modulate the external force applied to the servo valve closure, to position the servo valve closure selectively intermediate the open and closed positions.

8. The fluid regulating device of claim 1 wherein:
   said fixed orifice and said servo valve orifice are formed in a monolithic semiconductor chip.

9. The fluid regulating device of claim 8 further including:
a sensor for detecting the flow rate of fluid through the main passage.

10. The fluid regulating device of claim 9 wherein:
said sensor is formed on said semiconductor chip.

11. The fluid regulating device of claim 1 wherein:
said control chamber has at least a predetermined minimum volume, selected to ensure that the main valve closure takes at least a first predetermined period of time to move away from the valve seat to open the main valve means in response to closure of the servo valve means.

12. The fluid regulating device of claim 11 wherein:
the volume of the control chamber further has at most a predetermined maximum volume, to insure that the main valve closure moves to engage the valve seat and thereby close the main valve means within a second predetermined period of time after opening of the servo valve means.

13. A fluid regulating device including:
a fluid valve housing having an inlet port, and exit port, a main fluid passage between the inlet port and the exit port, and a servo passage between the inlet port and the exit port;
a control chamber within the housing and in fluid communication with the servo passage;
a main valve means including a valve seat in the main fluid passage, and a main valve closure member mounted near the valve seat and movable against the valve seat to close the main valve responsive to an increase in fluid pressure in the control chamber, said closure member movable away from the valve seat to open the main valve responsive to a decrease in fluid pressure in the control chamber;
a monolithic semiconductor chip mounted in the housing;
a fixed orifice formed through the semiconductor chip and disposed within the servo passage, for allowing fluid flow between the control chamber and a selected one of said inlet and outlet ports; and
a servo valve means including a servo valve orifice formed through said semiconductor chip and disposed in the control passage for allowing fluid flow between the control chamber and the other of said inlet and outlet ports, said servo valve means further including a servo valve closure mounted proximate the servo valve orifice for movement between a closed position against the servo orifice to prevent fluid flow therethrough, and an open position for allowing fluid flow through the servo orifice.

14. The fluid regulating device of claim 13 further including:
a sensing means mounted on said semiconductor chip for detecting the rate of fluid flow along the chip.

15. The fluid regulating device of claim 13 wherein:
said servo valve orifice comprises at least one aperture, and said servo closure comprises at least one tab movable toward and away from an associated aperture of the servo valve orifice.

16. The fluid regulating device of claim 15 wherein:
said tab is formed as part of a dielectric layer applied to said semiconductor chip.

17. The fluid regulating device of claim 16 further including:
a first electrode encapsulated within the tab, and a second electrode proximate the servo valve orifice and integral with said semiconductor chip, and a means for varying the potential of at least one of said electrodes to generate an electrostatic force for determining the position of the tab.

18. The fluid regulating device of claim 17 wherein:
said tab is in the open position when no potential difference is applied between the first and second electrodes, and is deformable to the closed position responsive to applying a predetermined potential difference.

19. The fluid regulating device of claim 13 wherein:
the fixed orifice is disposed between the exit port and the control chamber, and has a predetermined profile selected to restrict fluid flow to a predetermined maximum, based upon a maximum expected pressure differential across the fixed orifice.

20. The fluid regulating device of claim 19 wherein:
said main valve closure member includes a flexible membrane forming a partition between the main passage and the control chamber.

21. The fluid regulating device of claim 20 wherein:
said control chamber has a minimum predetermined volume, based upon the profile of the fixed orifice and said maximum pressure differential, to insure that movement of the membrane away from engagement against the valve seat, to open the main valve means in response to closure of the servo valve means, takes a least a first predetermined period of time.

22. The fluid regulating device of claim 21 wherein:
said control chamber further has a predetermined maximum volume whereby movement of the membrane into engagement against the valve seat, in response to opening of the servo valve, takes at most a second predetermined period of time.

23. The fluid regulating device of claim 13 wherein:
said fixed orifice is disposed between the inlet port and the control chamber, and wherein the servo valve orifice is disposed between the control chamber and the outlet port.

24. The fluid regulating device of claim 23 wherein:
said control chamber has a predetermined maximum volume, based upon a fluid pressure differential across the servo valve orifice and the profile of the servo valve orifice, whereby closure of the main valve means, in response to closure of the servo valve means, takes at most a first predetermined period of time.

25. The fluid regulating device of claim 24 wherein:
the main valve closure mean comprises a flexible membrane forming a partition between the main passage and the control chamber.

26. The fluid regulating device of claim 25 wherein:
said control chamber further has a predetermined minimum volume to ensure that the opening of the main valve means, responsive to opening the servo valve means, takes at least a second predetermined period of time.

27. An apparatus for governing the flow of fluid through a fluid regulating device, said device including a housing having an inlet port, an outlet port, a main fluid passage between the inlet port and the outlet port, a control passage, a control chamber in fluid communication with the control passage, and a main valve including a valve seat in the main fluid passage and a flexible membrane forming a partition between the main fluid passage and the control chamber and movable between valve opening and valve closing positions responsive to changes in fluid pressure in the control chamber; wherein said governing apparatus includes:

a monolithic semiconductor chip mounted in the housing, a fixed orifice formed through the semiconductor chip and disposed in the control passage for permitting fluid flow between the control chamber and a selected one of said inlet and outlet ports; and a servo valve including a servo orifice formed through the semiconductor chip and disposed in said control passage for allowing fluid flow between the control chamber and the other of said inlet and outlet ports, said servo valve further including a closure mounted proximate the servo orifice for movement between a closure position against the servo orifice to prevent fluid flow therethrough, and an open position for allowing fluid flow through the servo orifice.

28. The apparatus of claim 27 further including:
a sensing means mounted on the semiconductor chip, for detecting the rate of fluid flow proximate the chip.

29. The apparatus of claim 28 further including:
first and second filtering means integral with the semiconductor chip and mounted respectively upstream and downstream of said servo valve.

30. The apparatus of claim 29 wherein:
said servo valve closure includes a tab secured with respect to the semiconductor chip, an unsecured portion of the tab being movable toward and away from the chip between the closure and open positions.

31. The apparatus of claim 30 wherein:
said tab is formed as part of a dielectric layer on a surface of the semiconductor chip.

32. The apparatus of claim 30 further including:
a first electrode integral with the tab, and a second electrode integral with the semiconductor chip and proximate the servo orifice, and means for controllably generating a potential difference between the first and second electrodes to electrostatically move the tab relative to the servo orifice.

33. The apparatus of claim 27 wherein:
said fixed orifice is disposed between the control chamber and the exit port, and said servo valve orifice is disposed between the control chamber and the inlet port, and wherein the profile of the fixed orifice is selected in accordance with an expected maximum fluid pressure differential across the fixed orifice, to restrict fluid flow to a predetermined maximum level responsive to said expected pressure differential.

34. The apparatus of claim 27 wherein:
said fixed orifice is disposed between the control chamber and the inlet port, and the servo valve orifice is disposed between the control chamber and the outlet port.

35. A fluid regulating device including:
a valve housing having an inlet port, an exit port, a main passage between the inlet port and the exit port, and a servo passage between the inlet port and the exit port;
a control chamber within the housing and in fluid communication with the servo passage;
a main valve means including a valve seat in the main passage, and a main valve closure mounted proximate the valve seat and movable against the valve seat to close the main valve means responsive to an increase in fluid pressure within the control chamber, said main valve closure further being movable away from the valve seat to open the main valve means responsive to a decrease in fluid pressure within the control chamber;
a fixed orifice in the servo passage for allowing fluid to flow from the control chamber to the exit port, and having a profile of a selected size for restricting the flow of fluid through the fixed orifice, under an expected maximum pressure differential across the orifice, to a predetermined maximum amount; and
a servo valve means in the servo passage including a servo valve orifice for allowing fluid to flow from the inlet port into the control chamber, and an elastically deformable tab mounted proximate the valve orifice form movement between a closed position against the servo valve orifice to prevent the flow of fluid therethrough, and an open position for allowing fluid to flow into the control chamber, said tab normally disposed in the open position, and movable into the closed position when subject to an external force.

36. The fluid regulating device claim 35 wherein:
said tab includes a metal electrode, and said external force is electrostatic force.

37. The fluid regulating device of claim 36 further including:
first and second filtering means respectively upstream and downstream of said servo valve means.

38. A fluid regulating device including:
a valve housing having an inlet port, an exit port, a main passage between the inlet port and the exit port, and a servo passage between the inlet port and the exit port;
a control chamber within the housing and in fluid communication with the servo passage;
a main valve means including a valve seat in the main passage, and a main valve closure mounted proximate the valve seat and movable against the valve seat to close the main valve means responsive to an increase in fluid pressure within the control chamber, said main valve closure further being movable away from the valve seat to open the main valve means responsive to a decrease in fluid pressure within the control chamber;
a fixed orifice formed in a monolithic semi-conductor chip and disposed in the servo passage for allowing fluid to flow from the control chamber to the exit port, and having a profile of a selected size for restricting the flow of fluid through the fixed orifice, under an unexpected maximum pressure differential across the orifice, to a predetermined maximum amount; and
a servo valve means in the servo passage including a servo valve orifice formed in said monolithic semi-conductor chip for allowing fluid to flow from the inlet port into the control chamber, and a servo closure mounted proximate the valve orifice for movement between a closed position against the servo valve orifice to prevent the flow of fluid therethrough, and an open position for allowing fluid to flow into the control chamber, wherein the servo closure is maintained normally open to keep the main valve closure against the valve seat, while allowing a continuous and acceptable leakage flow of the fluid, of at most said predetermined amount, from the inlet port to the exit port.

39. The fluid regulating device of claim 38 further including:
a sensor for detecting the flow rate of fluid through the main passage.

40. The fluid regulating device of claim 39 wherein:
said sensor is formed on said monolithic semi-conductor chip.

* * * * *